Jan. 30, 1951  R. FENNEMA  2,539,614
PERIPHERALLY SEALED JOINT
Filed March 18, 1948
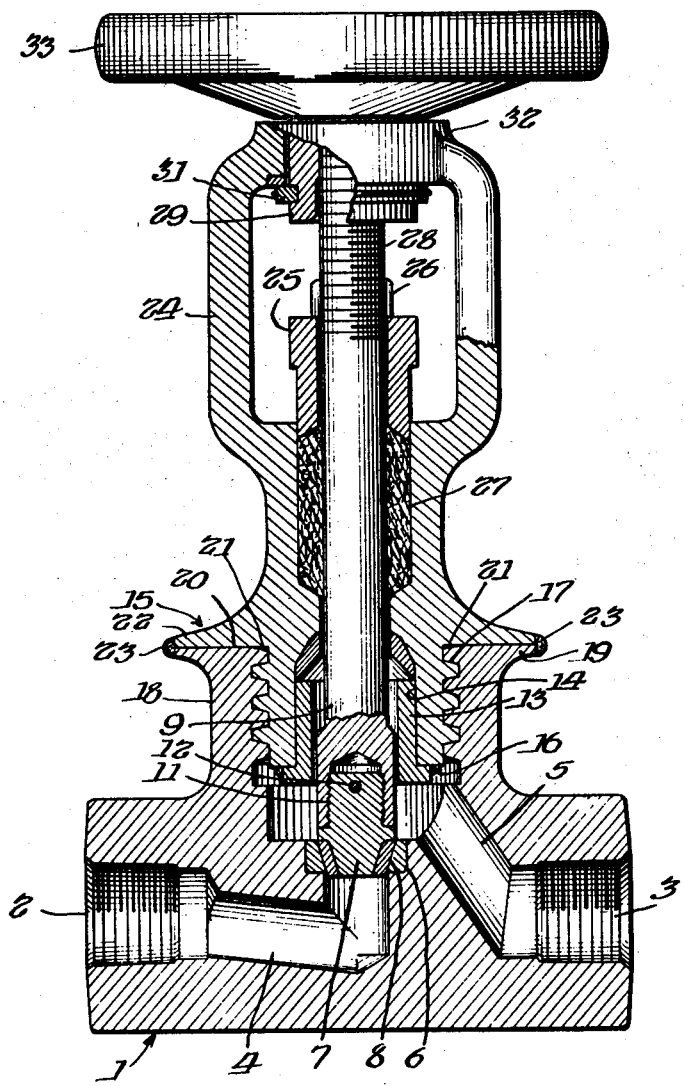
Inventor.
Richard Fennema.
By Joseph O. Lange Atty.

Patented Jan. 30, 1951

2,539,614

UNITED STATES PATENT OFFICE 2,539,614

PERIPHERALLY SEALED JOINT

Richard Fennema, Chicago, Ill., assignor to Crane Co., Chicago, Ill., a corporation of Illinois Application March 18, 1948, Serial No. 15,568

2 Claims. (Cl. 220—39)

1

This invention relates to joints for pressure vessels and more particularly it is concerned with a relatively simple and economical peripherally sealed joint for valves, fittings and the like in which the mechanical joint itself is relatively easily made, even by those not skilled in the art and likewise in which the ease of disassembly is a strong recommendation for its use.

Heretofore one of the principal objections to joints in connection with valves and fittings for use on high pressures and temperatures has been the inability to quickly and effectively make up a joint and at the same time to provide for fluid tightness. Also heretofore heavy joints have been used such as those employing large diameter bolts and heavy flanges with the result that frequently uneven expansion and contraction has occurred in the parts of the valve adjacent the bolted or joined portions. It frequently led to objectionable distortion.

It is therefore one of the principal objects of this invention to provide a joint which is not only easily assembled and manufactured but also one which in the field can easily be inspected or fabricated or removed for inspection as desired.

Another important object is to provide for a joint for use on relatively high pressures, say of the order of 1500# per sq. inch and advanced temperatures such as those approaching 1000° F. with the feature of unusual flexibility in meeting such strenuous service conditions.

Another object is to provide for a joint which may be weld sealed or brazed or otherwise suitably sealed annularly without being affected by temperatures applied to such weld or brazing. The adjoining parts due to the nature of the cross-section employed in the seal are not adversely acted upon.

Other objects and advantages will become more readily apparent upon proceeding with the specification read in light of the accompanying drawing in which a sectional assembly view is shown of a valve structure employing my invention.

Referring to the figure which is largely supplied for illustrative purposes only, the casing 1 is of the usual globe valve type having the respective inlet and outlet connections 2 and 3 for suitable attachment to a pipe line (not shown).

The valve body is provided with the usual ports 4 and 5 and a valve seat ring 6 which may be of any suitable material to resist temperatures or abrasion or pressures or the combination of all three conditions. The valve disc is conventional in that a suitable facing is applied at 8 and the disc is attached to the stem 9 by means of the thread 11 and the locking pin 12.

Serving as a guide for the stem and disc during the course of reciprocable movement, the stem hole bushing 13 is snugly received within the opening 14 of the bonnet 15. The stem hole

2 bushing is held against rotation and positioned rigidly within the bonnet by means of the annular welds 16. The bonnet 15 is provided with the relatively coarse threads 17 engaging similar threads within the flanged portion 18 of the body 1. At its upper end the flanged portion 18 is annularly tapered or reduced as indicated at 19 and at its upper inner surface portion is provided with the annular recess or counterbore 21 to permit improved shouldering of the bonnet 15 snugly within the portion 18. The bonnet 15 also has a reduced annular portion substantially coinciding with the lower annular portion 19 as indicated at 22. These annular thin portions 19 and 22 are preferably reduced as much as possible in order to allow for a very small cross-section to serve as the means for sealing the periphery as indicated by the weld 23. Of course the latter seal may be made by means of a brazed connection or suitably soldered depending upon the temperature encountered. Other suitable sealing may be used for sealing the outer periphery of the flanges 19 and 22. It has been found that by virtue of making the connection relatively light and also providing for the recessed portion 21 heat transmitted during the course of providing for the seal is reduced very substantially and the flange of the body and also of the bonnet is not distorted or warped during the sealing operation. At the same time the mechanical connection by means of the thread can be made relatively easily so as to provide the initial joint on the upper surface 20. The bonnet or yoke closure member 15 is provided with the usual arms 24, a stuffing box gland 25 compressed by means of the bolt and nuts 26 one of which is shown, and a conventional stuffing box packing 27. The stem is of the rising variety and is threaded at 28.

The conventional yoke sleeve 29 shown in partial section, suitably receives the stem threads 28 of the stem 9 and is held against substantial longitudinal movement by means of the split washer 31. The yoke sleeve at an upper portion (not shown) extends through the hub 32 of the yoke arms 24 and is non-rotatably connected to the handwheel 33 so that upon rotation of the latter member, the yoke sleeve is rotated which in turn causes the stem 9 to climb or move axially upon the threads 28 to effect reciprocal movement of the valve closure member 7 for opening and closing, depending upon the direction of rotation of the handwheel 33.

It should be understood that the valve is shown for illustrative purposes only since the type of joint described in detail may of course be applied to any type of pressure vessel in which a closure such as a bonnet or a yoke 15 is attached to the casing or body 1. In the latter connection it is understood that while the threads 17 are shown these may be dispensed with if desired by providing for a silver brazed connection, for example avoiding the use of threads or by otherwise mechanically attaching the extension of the yoke 15 to provide for the desired flexibility in the joint or connection.

Thus it is the intention not to be limited to the scope of the appended claims otherwise than necessitated by the prior art.

I claim:

1. In a fluid tight joint for a pressure vessel, the combination of a casing, a bonnet member for closing an opening in the casing, the said casing and bonnet having within said opening interengaging screw threads of relatively loose fit, the said casing and bonnet having surrounding the opening in the casing complementary abutting annular surfaces extending above and in a plane substantially at right angles to the axis of the screw threads, the said annular surfaces of casing and bonnet being in substantial abutting contact except for a relieved portion therebetween constituting an annular chamber immediately around the juncture formed by the interengaging threads of the casing and bonnet, the outer limits of the surfaces of the casing and bonnet defining the abutting contact therebetween being sealed, the latter sealing means comprising peripheral transversely extending lips on the casing and bonnet surrounding the respective abutting surfaces, an annular weld joining the lips, the said lips cooperating with the annular chamber and adjacent thinned portions of the bonnet and casing to form an annular hinge whereby coaxial strains between the casing and bonnet due to contraction and expansion are borne by the lips and the adjacent annular thinned portions of casing and bonnet exclusive of the weld seal.

2. In a fluid tight joint for a pressure vessel, the combination of a casing, a bonnet member for closing an opening in the said casing, the wall of the opening in the said casing being defined by screw threads, the said bonnet having a depending shank threaded to engage the threads in the wall of the opening in the casing, the said bonnet member and casing having abutting annular surfaces surrounding the opening in the casing and extending in a substantially horizontal plane, the abutting contact between said surfaces being unbroken except for a relieved portion therebetween forming an annular chamber extending around the base of the depending threaded shank of the bonnet member, the said bonnet and casing having adjacent said abutting surfaces peripheral lips, an annular weld for sealing the periphery of the said lips, the said lips being of gradually increased annular thickness as they recede inwardly toward the thread axis and away from the weld sealed portion, the thinned portions of the lips combining with the relieved portion interrupting the abutting surfaces to provide an annular hinge whereby axial loads directed against the said bonnet member are initially borne by the threaded shank and subsequently carried hingedly by the lips and independent of the weld seal.

RICHARD FENNEMA.

REFERENCES CITED

The following references are of record in the file of this patent:

UNITED STATES PATENTS

| Number | Name | Date |
|---|---|---|
| 1,630,761 | Prime | May 31, 1927 |
| 1,952,036 | Dillhoefer, Jr. | Mar. 20, 1934 |
| 1,958,582 | Kerr et al. | May 15, 1934 |

FOREIGN PATENTS

| Number | Country | Date |
|---|---|---|
| 664,465 | Germany | Aug. 27, 1938 |